Patented May 5, 1953

2,637,647

UNITED STATES PATENT OFFICE 2,637,647

HERBICIDAL COMPOSITIONS

Milton Kosmin, Dayton, Ohio, assignor to Monsanto Chemical Company, St. Louis, Mo., a corporation of Delaware No Drawing. Application January 24, 1952, Serial No. 268,140

7 Claims. (Cl. 71—2.5)

The present invention provides new and highly valuable herbicidal compositions and methods of destroying or preventing plant growth in which said compositions are employed.

I have found that improved, very efficient herbicidal compositions are obtained when there are prepared oil-in-water emulsions of 2-vinylmercaptobenzothiazole.

Herbicidal compositions containing the thiazole are readily obtained by first preparing a solution of the compound in an organic solvent and then adding the resulting solution to water containing an emulsifying agent to form an emulsion. Because of the very high herbicidal efficiency of 2-vinylmercaptobenzothiazole, it is present in the herbicidal composition in only very small concentrations, for example, in concentrations of from 0.1% to 2% by weight of the total weight of the emulsion. Emulsifying agents which may be employed are those customarily used in the art for the preparation of oil-in-water emulsions. The word "oil" is here used to designate any liquid which is insoluble in water. Examples of emulsifying agents which may be used include alkylbenzenesulfonates, long chained polyalkylene glycols, long chained succinates, etc. The emulsions may be used to destroy already existing plant growth by direct application to the undesirable plants, e. g., by spraying; or the emulsions may be employed to prevent plant growth by application to media which normally support plant growth. When employed to prevent plant growth, for example in parking areas, highway abutments, railway yards, etc., the emulsions may be applied by spraying only the surface of said media or they may be admixed with said media. Generally, spraying of only the soil surface is sufficient to prevent plant growth in areas which are to be kept clear of plants. However the emulsions may be incorporated into customarily employed temporary surfacing materials, e. g., soils, cinders, etc.

The present oil-in-water emulsions of 2-vinylmercaptobenzothiazole are particularly valuable in that when applied to the leaves of broad-leafed plants they cause leaf-drop. Application of the present herbicidal compositions to such plants as cotton, beans, and peas defoliates the plants and thus permits more efficient harvesting or hand-picking of the bolls or pods.

The present invention is further illustrated, but not limited, by the following examples:

Example 1

Spray testing of the present herbicidal compositions was conducted as follows:

A cyclohexanone solution of 2-vinylmercaptobenzothiazole together with an emulsifying agent was added to water, the quantity of solution employed being calculated to give emulsions containing 0.1%, 0.3% and 1.0% of the thiazole compound, respectively, based on the weight of the total emulsion. The quantity of emulsifying agent used was 0.2% by weight, based on the weight of the total emulsion. Said emulsifying agent comprised a mixture of a polyalkyleneglycol derivative and an alklybenzenesulfonate.

Three-week old corn and bean plants, respectively, were sprayed with the emulsions, two plants of each variety being employed. The spraying was continued until droplets formed on and/or fell from the foliage and stems of the sprayed plants, up to 15 ml. of the emulsion being applied to each plant. The sprayed plants as well as two untreated "blank" specimens of each plant were then allowed to remain under standard conditions of sunlight and watering for a period of one week. At the end of that time the sprayed plants were compared with the untreated plants in order to determine the extent of injury, if any. The following observations were made:

| Concentration of 2-vinylmercaptobenzothiazole in the emulsion | Effect On— | |
|---|---|---|
| | Bean | Corn |
| 0.1% | Moderate injury | Moderate injury. |
| 0.3% | Severe injury, leaves dropped. | Plant dead. |
| 1.0% | Plant dead, leaves dropped. | Plant dead, leaves dried. |

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with ¼" to ½" layer of soil which had been screened to ¼" sieve. Test boxes containing 20 seeds each of rye grass and beet seeds, respectively, were prepared. The surface soil of the seeded boxes was then sprayed, respectively, with the 1.0 per cent and the 0.3 percent emulsions of Example 1. The quantity of each emulsion which was applied was calculated to correspond to either 20 lbs. of the sulfide per acre or to 50 lbs. per acre. In the present instance, 10.8 cc. of the 0.3 per cent emulsion per 25 square inches of surface soil was calculated to correspond to 20 lbs. of the chemical per acre and 9.1 cc. of the 1.0 per cent emulsion to 50 lbs. of the chemical per acre. The sprayed boxes as well as similar seeded but unsprayed boxes were then maintained at standard conditions of temperature and watering for a period of two weeks. At the end of that time the number of healthy seedlings in each box was counted. Thus the number of nonemerging and damaged seedlings was obtained by difference. This difference is designated as "X." "Per cent phytotoxicity" was determined by the ratio of "X" to the number of healthy seedlings in the controls.

There was evidenced a 71–100% phytotoxicity to both test specimens at the 50 lbs./acre rate of application. At the 20 lbs. rate there was evidenced a phytotoxicity of up to 70% against rye grass and a phytotoxicity of up to about 45% against beets.

While the 2-vinylmercaptobenzothiazole is most advantageously employed as a herbicide by incorporating it into an aqueous emulsion as herein described it may also be employed in other plant destroying methods. Thus it may be incorporated into solid carriers such as clay, talc, pumice and bentonite to give herbicidal compositions which may be applied to living plants or to surfaces which are to be freed from plant growth. The thiazole may also be mixed with liquid or solid agricultural pesticides, e. g., insecticides and fungicides. While solutions of the compound in organic solvents may be employed for preventing and destroying plant-growth, I have found that the emulsions possess an improved tendency to adhere to the treated surfaces and that less of the active ingredient, i. e., the 2-vinylmercaptobenzothiazole, is required to give comparable herbicidal efficiency.

What I claim is:

1. A herbicidal composition comprising an oil-in-water emulsion of 2-vinylmercaptobenzothiazole, said thiazole being present in said emulsion in a quantity which is toxic to plant life.

2. The method of destroying undesirable plants which comprises applying to said plants a toxic quantity of a herbicidal composition comprising 2-vinylmercaptobenzothiazole.

3. The method of destroying undesirable plants which comprises applying to said plants a toxic quantity of a herbicidal composition comprising an oil-in-water emulsion of 2-vinylmercaptobenzothiazole.

4. The method of preventing plant growth which comprises applying to media normally supporting said growth a herbicidal composition comprising 2-vinylmercaptobenzothiazole.

5. The method of preventing plant growth which comprises applying to soil normally supporting said growth a herbicidal composition comprising 2-vinylmercaptobenzothiazole.

6. The method of preventing plant growth which comprises applying to soil normally supporting said growth an oil-in-water emulsion of 2-vinylmercaptobenzothiazole.

7. The method of defoliating plants which comprises applying to the foliage of said plants a herbicidal composition comprising an oil-in-water emulsion of 2-vinylmercaptobenzothiazole.

MILTON KOSMIN.

No references cited.